(12) United States Patent
Kueppers et al.

(10) Patent No.: US 11,975,577 B2
(45) Date of Patent: May 7, 2024

(54) TRAILER COUPLING ASSEMBLY FOR A MOTOR VEHICLE

(71) Applicant: Ford Global Technologies, LLC, Dearborn, MI (US)

(72) Inventors: Christoph Kueppers, Kerpen (DE); Ulrich Reske, Erftstadt (DE)

(73) Assignee: Ford Global Technologies, LLC, Dearborn, MI (US)

( * ) Notice: Subject to any disclaimer, the term of this patent is extended or adjusted under 35 U.S.C. 154(b) by 252 days.

(21) Appl. No.: 17/534,736

(22) Filed: Nov. 24, 2021

(65) Prior Publication Data
US 2022/0161618 A1 May 26, 2022

(30) Foreign Application Priority Data
Nov. 26, 2020 (DE) .................. 10 2020 214864.3

(51) Int. Cl.
*B60D 1/48* (2006.01)
*B60D 1/54* (2006.01)

(52) U.S. Cl.
CPC .............. *B60D 1/485* (2013.01); *B60D 1/54* (2013.01)

(58) Field of Classification Search
CPC .................................................. B60D 1/485
See application file for complete search history.

(56) References Cited

U.S. PATENT DOCUMENTS

| 5,094,469 | A | 3/1992 | Yamamoto et al. | |
| 7,971,895 | B2* | 7/2011 | Kozuka | B60D 1/485 |
| | | | | 280/495 |
| 9,457,633 | B2* | 10/2016 | Krieger | B21D 5/015 |
| 9,505,280 | B2* | 11/2016 | Furukawa | B60D 1/243 |
| 9,731,569 | B2* | 8/2017 | McGuckin | B60D 1/485 |
| 10,696,112 | B2* | 6/2020 | Meingast | B60D 1/485 |
| 2004/0108737 | A1 | 6/2004 | Evans | |
| 2009/0072586 | A1 | 3/2009 | Aghssa et al. | |

(Continued)

FOREIGN PATENT DOCUMENTS

| CN | 115339274 A | * 11/2022 |
| DE | 102011112258 A1 | 3/2013 |
| DE | 102012015244 A1 | 12/2013 |

(Continued)

OTHER PUBLICATIONS

German Search Report for Application No. 10 2020 214 864.3 dated Jun. 29, 2021.

*Primary Examiner* — Kevin Hurley
(74) *Attorney, Agent, or Firm* — Todd W. Dishman; Carlson, Gaskey & Olds, P.C.

(57) ABSTRACT

A trailer coupling assembly for a motor vehicle according to an exemplary aspect of the present disclosure includes, among other things, a cross-beam extending in a transverse direction of the motor vehicle. The cross-beam is configured to connect to a trailer coupling. The assembly further includes a mount connected to a body of the motor vehicle and a connection assembly. The connection assembly includes a plate connecting the mount to the cross-beam. The plate is configured to absorb energy and deform in response to application of a threshold force. The design does not compromise trailer towing capability or package space and can be regarded as a hybrid approach between existing bumper beam and trailer tow designs.

18 Claims, 3 Drawing Sheets

(56) References Cited

U.S. PATENT DOCUMENTS

2013/0056959 A1* 3/2013 Mathes ................ B62D 21/152
                                                      280/504

FOREIGN PATENT DOCUMENTS

| DE | 102012018546 A1 | | 3/2014 | | |
|----|-----------------|---|--------|---|---|
| DE | 102015106489 A1 | | 11/2015 | | |
| EP | 2803509 A1 | * | 11/2014 | ............. | B60D 1/485 |
| EP | 2803510 A1 | * | 11/2014 | ............. | B60D 1/485 |
| JP | 2022014526 A | * | 1/2022 | | |
| KR | 102547217 B1 | * | 6/2023 | | |
| WO | 2018162024 A1 | | 9/2018 | | |

* cited by examiner

TRAILER COUPLING ASSEMBLY FOR A MOTOR VEHICLE

CROSS REFERENCE TO RELATED APPLICATIONS

This disclosure claims priority to German Patent Application No. DE 10 2020 214864.3, which was filed on Nov. 26, 2020 and is incorporated herein by reference in its entirety.

TECHNICAL FIELD

The disclosure relates to a trailer coupling assembly for a motor vehicle.

BACKGROUND

Trailer couplings can be used to fasten carrier elements such as, for example, bicycle carriers to the motor vehicle. Trailer couplings are also used to connect a trailer to a motor vehicle in order to pull the trailer. Different systems are known to do this, for example bolt couplings, claw couplings, or fifth-wheel couplings. A ball head coupling is generally used for passenger cars, wherein a coupling ball on the vehicle can be connected to a drawbar ball coupling on the trailer. In addition to rigidly mounted couplings, removable couplings and swivel couplings are also known for the vehicle side. According to a typical structural form, the coupling is connected directly or indirectly to a cross-tube or cross-beam which extends in the transverse direction of the vehicle and is connected at both ends to the vehicle body. Attachment of the cross-tube to the bodywork is normally preferred. The attachment is here generally not provided directly and instead via a connection assembly which can consist, for example, of sheet-metal parts.

Because a pulling force needs to be transmitted between the motor vehicle and the trailer via the connection assembly, the latter has a relatively stable design. This can, however, be a disadvantage in the event of a force applied to a rear of the vehicle or trailer because force is introduced either primarily into the trailer coupling and from there into the cross-tube or directly into the latter, wherein in each case the force flows on to the vehicle body via the connection assembly.

SUMMARY

A trailer coupling assembly for a motor vehicle according to an exemplary aspect of the present disclosure includes, among other things, a cross-beam extending in a transverse direction of the motor vehicle. The cross-beam is configured to connect to a trailer coupling. The assembly further includes a mount connected to a body of the motor vehicle and a connection assembly. The connection assembly includes a plate connecting the mount to the cross-beam. The plate is configured to deform in response to application of a threshold force.

In a further non-limiting embodiment of the foregoing assembly, the cross-beam includes a central section and two side sections on opposite sides of the central section, and the central section is arranged further forward with respect to a longitudinal direction of the motor vehicle than the two side sections, and one of the two side sections is connected to the plate.

In a further non-limiting embodiment of any of the foregoing assemblies, the central section is vertically above the two side sections.

In a further non-limiting embodiment of any of the foregoing assemblies, the central section and the side sections are connected by intermediate sections inclined at an angle of between 20° and 40° relative to the transverse direction of the motor vehicle.

In a further non-limiting embodiment of any of the foregoing assemblies, the plate includes at least one section angled at a non-zero angle to a longitudinal direction of the vehicle.

In a further non-limiting embodiment of any of the foregoing assemblies, the plate includes a plurality of sections angled relative to one another.

In a further non-limiting embodiment of any of the foregoing assemblies, the plate includes a first section adjacent the mount, the plate includes a second section adjacent the first section, the plate includes a third section adjacent the cross-beam, at least one of the first, second, and third sections is inclined at a different angle relative to the longitudinal direction of the motor vehicle than at least one other of the first, second, and third sections.

In a further non-limiting embodiment of any of the foregoing assemblies, each of the first, second, and third sections has a different inclination relative to the longitudinal direction of the motor vehicle.

In a further non-limiting embodiment of any of the foregoing assemblies, each of the first, second, and third sections runs parallel to a vertical direction of the motor vehicle.

In a further non-limiting embodiment of any of the foregoing assemblies, the plate has at least one notch in an edge thereof.

In a further non-limiting embodiment of any of the foregoing assemblies, the plate includes at least one through-opening.

In a further non-limiting embodiment of any of the foregoing assemblies, the plate is a first plate, the trailer coupling assembly includes a second plate spaced-apart from the first plate, the second plate connects the mount to the cross-beam, and the second plate is configured to deform in response to application of the threshold force.

In a further non-limiting embodiment of any of the foregoing assemblies, on sides opposite the mount, the first and second plates each include a recess configured to receive the cross-beam between vertically-offset claws.

In a further non-limiting embodiment of any of the foregoing assemblies, the first and second plates are substantial mirror images of one another about a plane between the first and second plates that extends parallel to the longitudinal direction of the motor vehicle.

In a further non-limiting embodiment of any of the foregoing assemblies, the threshold force is a predefined force above which the plate will deform plastically.

A motor vehicle according to an exemplary aspect of the present disclosure includes, among other things, a trailer coupling, a cross-beam extending in a transverse direction of the motor vehicle, wherein the cross-beam is connected to the trailer coupling, a mount connected to a body of the motor vehicle, and a connection assembly. The connection assembly includes first and second plates connecting the mount to the cross-beam. The first and second plates are configured to deform in response to application of a threshold force. The first and second plates include a first section adjacent the mount, a second section adjacent the first section, and a third section adjacent the cross-beam. Each of the first, second, and third sections has a different inclination relative to a longitudinal direction of the motor vehicle. Each of the first, second, and third sections runs parallel to a vertical direction of the motor vehicle. The first and second plates each have at least one notch in an edge thereof. The first and second plates each include at least one through-opening. Further, on sides opposite the mount, each of the first and second plates include a recess configured to receive the cross-beam between vertically offset claws.

In a further non-limiting embodiment of the foregoing motor vehicle, the first and second plates are substantial mirror images of one another about a plane between the first and second plates that extends parallel to the longitudinal direction of the motor vehicle.

A method according to an exemplary aspect of the present disclosure includes, among other things, deforming a plate in response to application of a threshold force. The plate connects a cross-beam to a mount of a motor vehicle. A trailer coupling is connected to the cross-beam.

In a further non-limiting embodiment of the foregoing method, the plate includes a first section adjacent the mount, the plate includes a second section adjacent the first section, the plate includes a third section adjacent the cross-beam, and each of the first, second, and third sections has a different inclination relative to a longitudinal direction of the motor vehicle.

In a further non-limiting embodiment of any of the foregoing methods, the cross-beam includes a central section and two side sections on opposite sides of the central section, the central section is arranged further forward with respect to a longitudinal direction of the motor vehicle than the two side sections, one of the two side sections is connected to the plate, the central section is vertically above the two side sections, and the central section and the side sections are connected by intermediate sections which run at an angle of between 20° and 40° relative to the transverse direction of the motor vehicle.

DETAILED DESCRIPTION

Figure 1:
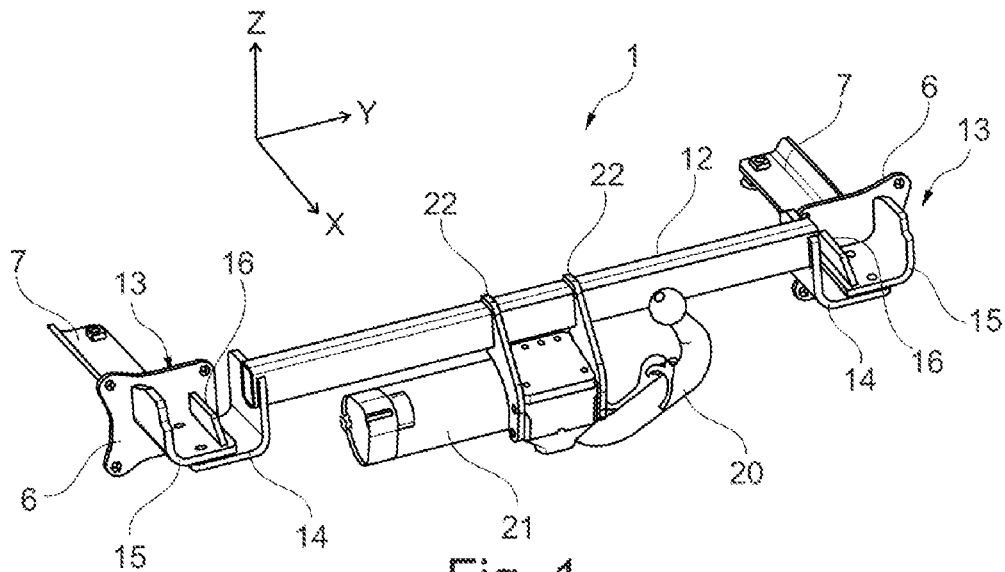
FIG. 1 shows a perspective view of a trailer coupling assembly according to the prior art.
Figure 2:
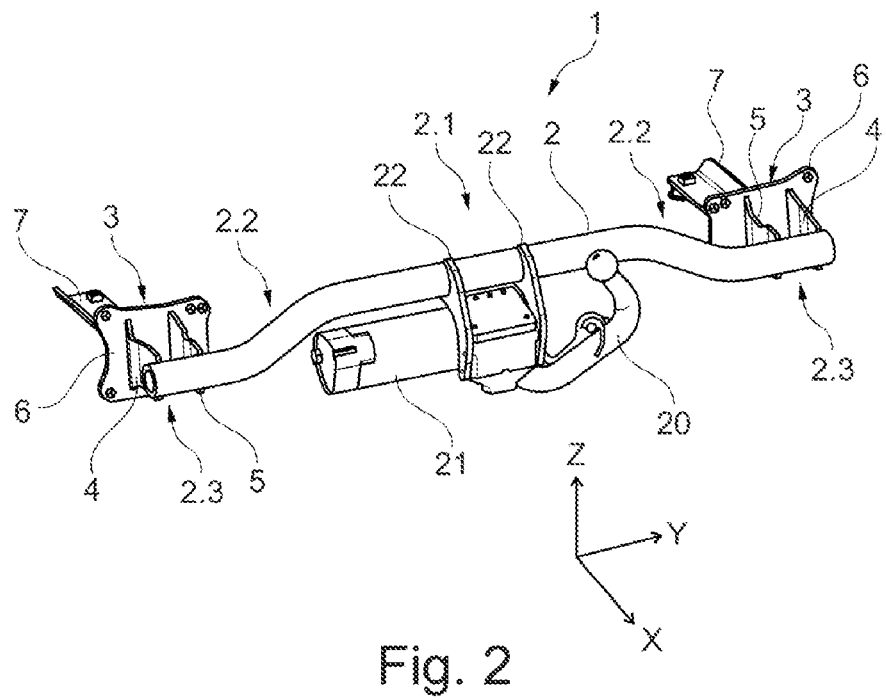
FIG. 2 shows a perspective view of a first embodiment of a trailer coupling assembly according to this disclosure.

It should be pointed out that the features and measures explained individually in the following description can be combined with one another in any technically meaningful way, and represent further embodiments of the disclosure. The description characterizes and specifies the disclosure in particular additionally in conjunction with the drawings.

A trailer coupling assembly for a motor vehicle is provided in this disclosure. The motor vehicle can in particular be a passenger car but can also be a light to medium truck or a van, as examples. The trailer coupling assembly is associated with a trailer coupling and can comprise the trailer coupling. The trailer coupling itself is provided to couple a trailer to the motor vehicle so that it can be pulled or to fasten a carrier element thereto. The term "trailer coupling" does not refer to any coupling on a vehicle which happens to indirectly couple to a trailer but rather refers in a more narrow sense to the part which of the motor vehicle that is especially design and suited to couple to a trailer. The trailer coupling can, for example, be a ball head coupling. It can be rigidly mounted with respect to the trailer coupling assembly but alternatively can also be removable or adjustable, in particular adjustable by a motor.

The trailer coupling assembly has a cross-beam extending in the transverse direction of the vehicle, perpendicular to the centerline of the vehicle, and which has a central section for at least indirect attachment of a trailer coupling and, on both sides thereof, in each case a side section which is connected to a mounting element on the vehicle body via a connection assembly. The cross-beam is normally manufactured from metal, for example from steel. The cross-beam is normally designed as a cross-tube. It can have a uniform cross-section along its entire length, which in the case of a cross-tube can in particular be designed as a circle but can also be designed, for example, as an ellipse or a rectangle. Besides a uniform cross-section, a cross-section which changes in some places could also be considered, wherein the cross-tube can be designed as a tailored tube. The cross-beam is preferably designed as a single piece, which includes the possibility of the cross-beam consisting of a plurality of separately prefabricated individual parts materially connected (for example, welded) to one another. The cross-beam extends in the transverse direction of the vehicle (Y direction), i.e. along the transverse axis of the vehicle (Y axis). It can run at least in some places parallel to the transverse direction of the vehicle but at least in some places also obliquely thereto. This and other statements regarding the orientation of elements of the trailer coupling assembly relate to the properly installed state in or on the motor vehicle. The cross-beam has a central section which is provided for at least indirect attachment of the trailer coupling, i.e. in the assembled state, the trailer coupling is connected directly or indirectly to this central section. Depending on the embodiment, an adjustment mechanism of the trailer coupling, including a drive motor, can for example also be connected to the central section.

On both or opposite sides of the central section, the cross-beam has side sections. The side sections can directly adjoin the central section or at least one further section can be placed in between. Each side section is connected to a mounting element on the vehicle body side via a respective connection assembly. In the assembled state, the mounting element is arranged on the vehicle body side, wherein "vehicle body" is used as a generic term for those parts of the vehicle which form the sprung mass, i.e. the bodywork and chassis. The mounting element is provided to be mounted on the vehicle body, i.e. to be connected to the latter. The mounting element is normally connected to the bodywork. The connection can be established, for example, by screws or rivets. The side section is connected to the mounting element via the connection assembly, i.e. the connection assembly is placed structurally and also in terms of a possible flow of force between the side section (of the cross-beam or cross-tube) and the mounting element. In order to ensure a reliable connection between the vehicle body and the trailer coupling, the components are designed such that, during normal operation of the motor vehicle coupled to a trailer, at most a slight elastic deformation of the mounting element, the connection assembly, and the cross-beam occurs. Because the trailer coupling assembly is situated at the rear of the vehicle, the mounting element is arranged at least partly but also possibly completely in front of the associated connection assembly with respect to the longitudinal direction of the vehicle (X direction), i.e. facing the front of the vehicle. Although a terminological distinction is made here between the mounting element and the connection assembly, it is possible that these two parts of the trailer coupling assembly are manufactured as a single piece with each other. It is moreover in particular possible that they are materially connected to each other, for example by welding.

According to the disclosure, each side section is arranged in the transverse direction of the vehicle and in the vertical direction of the vehicle at least partly at the height of the mounting element and the connection assembly is configured to deform in an energy-absorbing fashion in the event of a threshold force acting on the side section in the longitudinal direction of the vehicle in the direction of the mounting element. The side section is arranged at least partially at the height of the mounting element both in the transverse direction of the vehicle and in the vertical direction of the vehicle (Z direction). This means in other words that the side section is at least partially aligned with the mounting element in the longitudinal direction of the vehicle, i.e. lies on a line with the mounting element. This in turn normally entails that the connection assembly is arranged at least partially between the side section and the mounting element in the longitudinal direction of the vehicle.

If, for example, a force directed forward in the longitudinal direction of the vehicle acts on the trailer coupling and/or the cross-beam in the event of a force applied to a rear-end, the connection assembly is stressed primarily by compressive forces. The connection assembly is designed to deform in an energy-absorbing fashion in the event of a threshold force which acts on the side section in the longitudinal direction of the vehicle in the direction of the mounting element. The corresponding threshold force is here a compressive force which acts forward on the side section in the direction of the mounting element. Such a force occurs, for example, in the case of a force applied to a rear-end of the trailer, for example. It can be a force which acts directly on the side section, or a force which acts on other parts of the cross-beam or on the trailer coupling and is transmitted within the cross-beam to the side section. Because the side section and the mounting element are arranged at least partly along the X-axis on a line, they are normally pushed against each other by the corresponding force, which in turn is only possible by deformation of the connection assembly. The connection assembly is for its part designed in such a way that it withstands a corresponding force until the threshold force is reached and, when the threshold force is reached or exceeded, yields as planned by deforming in an energy-absorbing fashion, i.e. by dissipating energy. The arrangement according to the disclosure of the side section relative to the mounting element can also be advantageous during normal operation of the motor vehicle because the connection assembly extends in the direction of the main tensile load which is to be expected (in the X direction).

The value of the threshold force can be defined by the design of the connection assembly. The connection assembly is configured such that, in the event of rather low compressive forces which can occur, for example, when reversing with a trailer, it does not experience any (plastic) deformation. In this respect, the term "rear-end" also refers to those cases in which the force is applied at an angle to the longitudinal direction of the vehicle, for example up to 10° or up to 30°.

It is in principle possible that the cross-beam is designed so that it is straight in its entirety and runs parallel to the transverse direction of the vehicle such that the central section and the side sections are arranged at the same height both with respect to the X-axis and with respect to the Z-axis. It is, however, preferred that the central section is arranged further forward with respect to the longitudinal direction of the vehicle than the side sections, i.e. the central section is arranged closer to the front of the vehicle with respect to the longitudinal direction of the vehicle than the side sections. It is consequently possible to provide sufficient structural space for the trailer coupling, or for a suspension element which carries the trailer coupling, on the central section. The corresponding structural space is delimited to the rear, for example, by a bumper. On the other hand, the side sections are displaced rearward, as a result of which the possible length of the connection assembly (in the longitudinal direction of the vehicle) and hence the possible deformation length in the event of a force applied to the rear-end are increased.

For structural reasons, it can also be preferred that the central section is arranged higher with respect to the vertical direction of the vehicle (i.e., direction normal to adjacent ground surface upon which wheels normally sit) than the side sections and at least one suspension element of the trailer coupling extends downward from the central section. In other words, the central section is arranged above the side sections. The trailer coupling can in contrast be arranged at the height of the side sections or even lower than the latter because it is connected to the central section via the at least one suspension element which extends downward from the central section. Apart from the trailer coupling itself, an adjustment mechanism of the trailer coupling including a drive motor via which at least one suspension element can, for example, also be suspended on the central section. Even when the force is introduced first into the trailer coupling and via the at least one suspension element into the higher arranged central section, the force can, by virtue of the connected (as described above, normally one-piece) design of the cross-beam, be passed onward via the side sections into the connection assembly where it results in the intended energy absorption.

If the central section is displaced forward and/or upward relative to the end sections, the cross-beam must comprise bends and changes of direction. The central section and the side sections are preferably connected by intermediate sections which run at an angle of between 20° and 40° relative to the transverse direction of the vehicle. In an example, at least the central section, and possibly also the side sections, run at an angle of no more than 30° or no more than 20° relative to the transverse direction of the vehicle, and possibly also parallel to the latter. The described embodiment is generally characterized by relatively small or gentle changes of direction of the cross-beam, which can benefit its overall stability and hence the transfer of force between the individual parts of the cross-beam.

According to an embodiment, the mounting element is designed as a mounting flange which extends in the transverse direction of the vehicle and in the vertical direction of the vehicle, i.e. the mounting flange extends along the Y-Z plane and can in particular also within or parallel to the latter. It is usually designed as a sheet-metal part with sufficient rigidity which can be connected, for example, to an opposite flange of a bodywork part, for example by screws or rivets. In this embodiment, the mounting flange is normally prefabricated separately from the connection assembly and connected thereto subsequently, possibly by being materially joined. The connection to the vehicle body can be supplemented, for example, by a connecting element which extends in the longitudinal direction of the vehicle, is arranged inside a longitudinal beam of the bodywork, and is secured (for example, screwed) there. Such a connecting element can be made from sheet metal and be connected to the mounting flange, for example by welding.

Each connection assembly preferably has at least one connecting plate extending in the longitudinal direction of the vehicle between the joining element and the side section. The corresponding connecting plate is here designed as a shaped sheet-metal part and can in particular be made from steel, although a design using other metals, for example a suitable aluminum alloy, is also possible. The connecting plate is normally materially connected to the cross-beam, for example by welding. It extends in the longitudinal direction of the vehicle between the joining element and the side section and in this respect is placed between them, but this does not exclude the possibility that it extends beyond the joining element and/or the side section. Although the connecting plate extends in the longitudinal direction of the vehicle, it does not have to run completely parallel to the longitudinal direction of the vehicle or to the X-axis. Because the connecting plate per se is less compressible, in the event of a rear-end force it normally dissipates energy predominantly by deformation such as bending or buckling. This dissipation of energy can be supplemented, for example, by deformation of the cross-beam or cross-tube.

If the connecting plate runs completely parallel to the longitudinal direction of the vehicle, it is difficult to induce a controlled or predictable deformation thereof in the event of a force acting in the longitudinal direction of the vehicle. It is therefore preferred that at least one connecting plate runs at least in some places at a non-zero angle to the longitudinal direction of the vehicle. A connecting plate or a section thereof which runs in this way at an angle (i.e. not parallel) to the longitudinal direction of the vehicle is partly stressed by a force which acts in the longitudinal direction of the vehicle perpendicular to the plane in which the plate extends, as a result of which bending or buckling of the plate can be induced. The value of the abovementioned threshold force can here be influenced, inter alia, by the angle which the connecting plate encloses with the X-axis. In addition, the threshold force is also influenced by the shape of the connecting plate.

A predictable deformation can be obtained by at least one connecting plate having a plurality of sections which are angled relative to one another. The individual sections here have a different inclination relative to the longitudinal direction of the vehicle, wherein at least one section can also run parallel to the longitudinal direction of the vehicle. Relatively high stresses, which can induce bending or buckling, can occur in particular at the transition regions between the sections when the threshold force is reached. Moreover, a certain chronological sequence of the deformation can be produced, for example in such a way that sections with a greater inclination relative to the longitudinal direction of the vehicle deform before sections which run approximately or exactly parallel to the longitudinal direction of the vehicle.

The at least one connecting plate advantageously runs at an angle of less than 30° to the vertical direction of the vehicle. The angle can furthermore be less than 20° or less than 10°. It is hereby intended that the plane of extent of the connecting plate encloses the appropriate angle with the Z-axis. In particular, the connecting plate can run parallel to the vertical direction of the vehicle (Z direction). Because the connecting plate normally deforms, for example bends or buckles, perpendicular to its plane of extent in the event of an applied force, the deformation happens in this case at least partly or predominantly in the transverse direction of the vehicle. In other words, when they deform, parts of the connecting plate move primarily to the side and only minimally upward or downward. It is accordingly unlikely that the cross-beam connected to the connecting plate performs a corresponding upward or downward movement. In the embodiment described here, each connecting plate can have a recess which complements the shape of the cross-beam and claw sections arranged above or below the recess and between which the cross-beam is held vertically positively. The corresponding positive connection, normally together with the abovementioned material connection, ensures that the connection between the connecting plate and the side section is not broken in the event of an accident.

In order to assist the planned yielding when the threshold force is exerted, it is preferred that at least one connecting plate has at least one recess which defines an intended buckling point. It is also possible to refer to an intended buckling line instead of an intended buckling point. The recess can here be designed, for example, as a through opening inside the connecting plate, as an indentation or notch on the edge, or as a groove which can be stamped or pressed into the connecting plate. The intended buckling point is a point at which it is intended that the connecting plate yields early on as part of the deformation, there being no clear distinction between bending and buckling of the plate. It should be understood that, depending on the type of the force and the resulting forces on the trailer coupling assembly, it cannot be predicted with certainty whether the connecting plate actually yields first at the intended buckling point. In any case, the recess increases the likelihood that early yielding occurs there when force is exerted.

In order to assist the energy-absorbing deformation of the respective connecting plate, it is also preferred that the latter has a straight, unbranched cross-section in a plane transverse to the longitudinal direction of the vehicle, i.e. if the cross-section of the respective connecting plate within the Y-Z plane is viewed, it preferably has a straight profile with no branching. Both a curved or angled shape (for example, in the manner of an L-profile) and branching (for example, in the manner of a T-profile), could stabilize the connecting plate undesirably with respect to forces in the longitudinal direction of the vehicle.

In principle, both reliable attachment during the normal operation of the motor vehicle and undesired behavior can be obtained with only one connecting plate per connection assembly. However, in general both objectives can be achieved more reliably if each connection assembly has two connecting plates spaced apart transversely with respect to the longitudinal direction of the vehicle. Put another way, the two connecting plates of a connection assembly are situated opposite each other transversely with respect to the longitudinal direction of the vehicle. If the respective connecting plate runs, as described above, at an angle of less than 30° with respect to the vertical direction of the vehicle, the two connecting plates of a connection assembly are spaced apart in the transverse direction of the vehicle or are situated opposite each other in the transverse direction of the vehicle. They can here be designed, for example, identically and be arranged in parallel but can also be designed mirror-symmetrically with respect to a plane lying between them. Depending on the angle of applied force, it can hereby be obtained that the deformation of the two connecting plates likewise takes place approximately mirror-symmetrically with respect to the plane. This in turn causes a movement of the end region of the cross-beam, directed at least predominantly in the longitudinal direction of the vehicle, which can be controlled relatively well. The distance between the connecting plates in the transverse direction of the vehicle can be chosen to be different. Advantageously, it is chosen to be large enough that the two connecting plates do not come into contact with each other, or do so only minimally, when the deformation takes place, and each plate can to a certain extent deform freely. For this purpose, the distance between the connecting plates in the transverse direction of the vehicle can be, for example, at least 50% or at least 70% of the distance between the joining element and the side section in the longitudinal direction of the vehicle.

In the various drawings, the same parts are always provided with the same reference numerals, and for this reason they are generally also described only once.

FIG. 1 shows a trailer coupling assembly 1 according to the prior art which is intended for a passenger car. The pivotable trailer coupling 20 and an associated servomotor 21 are arranged below a cross-tube 12 by means of which they are connected via two suspension elements 22. The straight cross-tube 12 runs parallel to the Y-axis and is connected at both ends to a connection assembly 13 including a first sheet-metal part 14 which is designed as an L-profile and is angled within the Y-Z plane. It is connected by screws to a second sheet-metal part 15 which is likewise designed as an L-profile. A third sheet-metal part 16 which is designed as parallel to the Y-Z plane is welded to the second sheet-metal part 15. All three sheet-metal parts 14-16 are welded to a mounting flange 6 which extends parallel to the Y-Z plane. It in turn is connected via screws or rivets (not shown here) to a vehicle body 30 (likewise not shown). The connection to the vehicle body 30 is supplemented by a sheet-metal part 7 which is screwed inside a longitudinal beam 31 (shown in FIGS. 5 and 6) of the vehicle body 30.

In particular by virtue of the L-profiles angled within the Y-Z plane, the connection assembly 12 has a high stability with respect to forces in the X direction, referring to both tensile forces (counter to the driving direction or toward the rear end of the vehicle) and compressive forces (in the driving direction or toward the front of the vehicle). On the other hand, the ends of the cross-tube 12 are offset inward toward the center of the vehicle relative to the respective mounting flange 6 with respect to the transverse direction of the vehicle. If, in the event of a force applied to a rear-end, a force acts on the trailer coupling 10 or directly on the cross-tube 12, it is transmitted to the connection assembly 13 on both sides. There is relatively low dissipation of energy by the connection assembly 13 owing to the high stability in the X direction. On the other hand, the cross-tube 12 can move forward to a certain extent in the X direction, inward past the respective mounting flange 6, wherein it is possible that the first sheet-metal part 14 is bent and/or the cross-tube 2 is torn off from the first sheet-metal part 14. In any case, it is to be expected that considerable deformation energy and acceleration forces are imparted to the vehicle body 30.

FIGS. 2-4B show a trailer coupling assembly 1 according to a first embodiment of this, which corresponds partly to the structural form shown in FIG. 1 and in these respects will not be explained again. There are, however, some significant differences. A cross-tube 2 to which the trailer coupling 20 is connected via the two suspension elements 22 has a central section 2.1 which extends parallel to the Y-axis. Adjoining them on both sides are intermediate sections 2.2 which lead downward and backward at an angle of approximately 30° relative to the Y-axis and in turn open into side sections 2.3 which in turn run parallel to the Y-axis. The central section 2.1 to which the suspension elements 22 are welded is thus arranged above the side sections 2.3 with respect to the Z-axis and in front of them with respect to the X-axis, i.e. facing the front of the vehicle. Each side section 2.3 is connected to a mounting flange 6 via a connection assembly 3. The respective side section 2.3 is here arranged at least predominantly at the height of the mounting flange 6 both with respect to the Y-axis and with respect to the Z-axis. Another possible way of expressing this is that the side section 2.3 lies at least predominantly on a line with the mounting flange 6 in the X direction. Because the central section 2.1 is displaced forward relative to the side sections 2.3, on the one hand there is sufficient structural space behind the central section 2.1 to accommodate the suspension elements 22 or the trailer coupling 20 arranged thereon for example in front of a bumper (not illustrated here). On the other hand, the side sections 2.3 are arranged far enough back that the connection assembly 3 has a relatively great length in the direction of the X-axis. Accordingly, the possible deformation length of the connection assembly 3 is also great.

Figure 3:
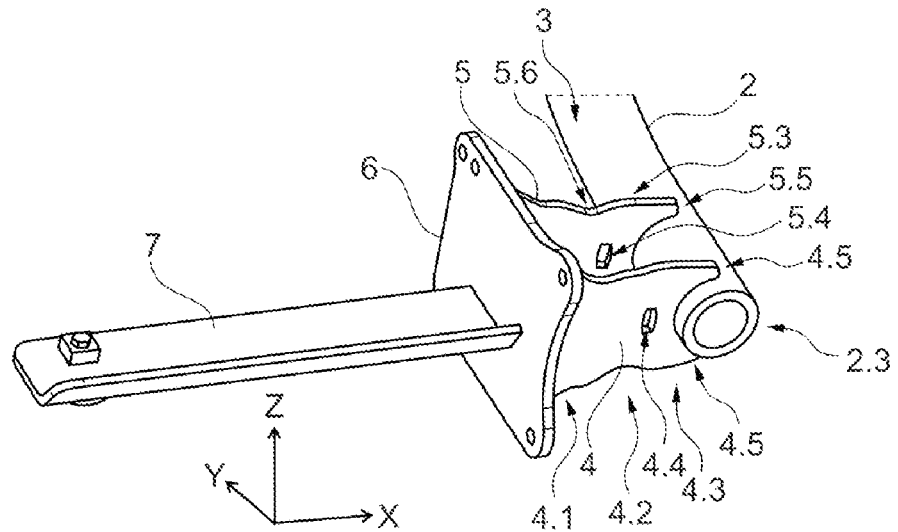
FIG. 3 shows a first detailed view of the trailer coupling assembly from FIG. 1 in a first state.
Figure 4A:
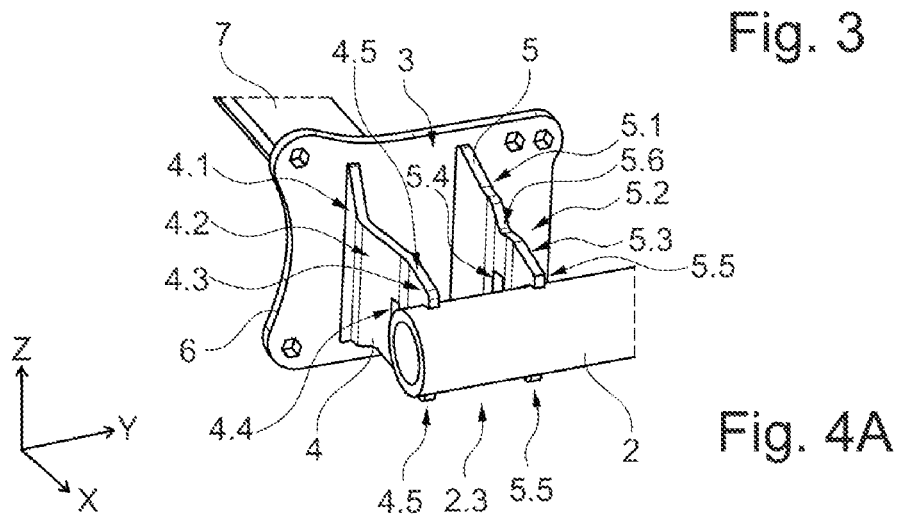
FIG. 4A shows a second detailed view of the trailer coupling assembly from FIG. 1 in the first state.

The structure of the first embodiment of the connection assembly 3 is illustrated in detail in FIG. 3 and in FIG. 4A. The connection assembly 3 has an outer connecting plate 4 and an inner connecting plate 5. The outer connecting plate 4 has a first section 4.1, a second section 4.2, and a third section 4.3 which follow one another in the X direction. The sections each run parallel to the Z-axis and are angled relative to one another such that they have a different inclination relative to the X-axis. In particular, the first section 4.1 and the second section 4.2 do not run parallel to the X-axis and instead are inclined at a non-zero angle relative to it.

A recess which matches the cross-section of the cross-tube 2 and is delimited vertically at the top and bottom by 2 claw sections 4.5 is formed on the third section 4.3. The cross-tube 2 or its side section 2.3 is held positively between the claw sections 4.5 along the Z-axis. In addition, the cross-tube 2 is welded to the outer connecting plate 4. The outer connecting plate 4 furthermore has a through opening 4.4 which is formed in the transition area between the second section 4.2 and the third section 4.3. The inner connecting plate 5 likewise has a first section 5.1, a second section 5.2, and a third section 5.3 which run parallel to the Z-axis and are angled relative to one another such that they have a different inclination relative to the X-axis. The respective inclination relative to the X-axis of the first sections 4.1, 5.1, of the second sections 4.2, 5.2, and of the third sections 4.3, 5.3 of the outer connecting plate 4 and the inner connecting plate 5 is designed to be at least approximately symmetrical to a plane lying between the two connecting surfaces 4, 5, parallel to the X-Z plane. In particular, the first section 5.1 and the second section 5.2 do not run parallel to the X-axis and instead are inclined relative to it. The third section 5.3 in turn has claw sections 5.5, 5.5 between which the cross-tube 2 is held positively. A through opening 5.4 is likewise formed in the transition area between the second section 5.2 and in the third section 5.3. A notch 5.6 is formed on the edge of the second section 5.2. The through openings 4.4, 5.4 and the notch 5.6 each represent targeted meetings of the respective connecting plate 4, 5 and define at least approximately intended buckling points or lines at which the connecting plate 4, 5 preferably yields when stressed. The two connecting plates 4, 5 have a straight, unbranched cross-section within the Y-Z plane, i.e. transversely to the X-axis.

In the event of a force applied to the rear-end in which a force directed forward in the X direction acts on the trailer coupling 20 and/or the cross-tube 2, the force flows through the connection assembly 3 and the mounting flange 6 to the vehicle body 30. Because the respective side section 2.3 is arranged on a line with the mounting flange 6 in the X direction, it is pressed directly toward the latter, wherein the two connecting plates 4, 5 of the connection assembly 3 are placed in between along the X-axis and exposed essentially to a compressive force running parallel to the X-axis.

Figure 4B:
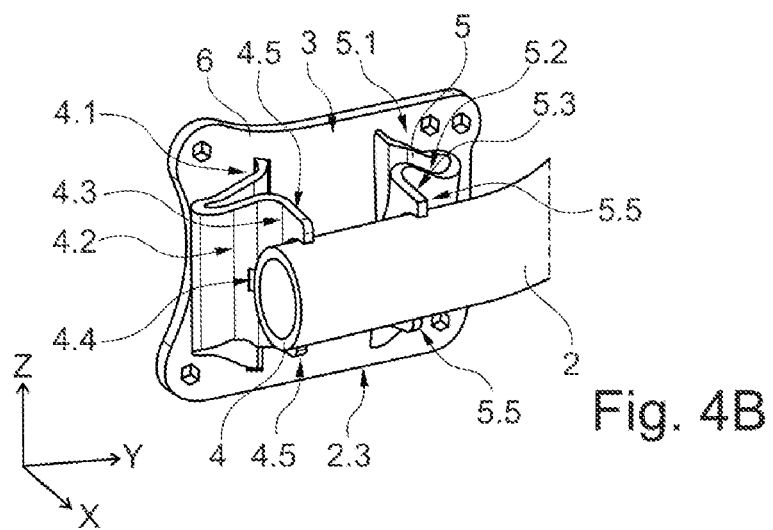
FIG. 4B shows a detailed view of the trailer coupling assembly after a force applied to a rear-end.

As soon as the corresponding compressive force reaches the value of a predefined threshold force, the connection assembly 3 begins to deform in an energy-absorbing fashion. The final state of such a deformation is illustrated in FIG. 4B. As before, the two connecting plates 4, 5 are connected to the mounting flange 6 and to the side section 2.3 of the cross-tube 2 such that the connection is not broken. There is, however, a deformation of the two connecting plates 4, 5. In this example, the deformation is a plastic deformation. The third sections 4.3, 5.3 have more or less preserved their orientation relative to the side section 2.3. In contrast, the first sections 4.1, 5.1 and second sections 4.2, 5.2 have been bent or buckled. The corresponding process is assisted by the sections being angled in pairs relative to each other and because the first sections 4.1, 5.1 and the second sections 4.2, 5.2 are each inclined relative to the X-axis. Various lateral force components (in the Y direction) result herefrom which cause the respective connecting plates 4, 5 to fold together in a concertina fashion. This happens at the outer connecting plate 4 in an approximately symmetrical fashion to the inner connecting plate 5 such that the former is folded substantially outward and the latter substantially inward. The side section 2.3 here moves essentially along the X-axis, wherein movements in the Y direction or Z direction are relatively small. The deformation is moreover assisted by the through openings 4.4, 5.4 and by the notch 5.6. This deformation is, on the one hand, connected with a dissipation of energy by means of which energy is not transferred to other parts of the vehicle.

Whilst FIG. 4B shows the deformation behavior in the event of a force applied to the rear-end in which the force is exerted (almost) exactly in the X direction, the trailer coupling assembly 1 also has advantages in the event of an oblique force to the rear-end, i.e. when the force is applied at an angle to the X direction, for example up to 10° or up to 30°, and possibly also more than that. In these cases, a considerable force component acts on the cross-tube 2 in the Y direction such that force components directed in the same direction in the Y direction result on the two connecting plates 4, 5. In this case, the two connecting plates 4, 5 can deform, for example, in an S-shape and approximately parallel to each other, whilst the side section 2.3 of the cross-tube 2 is deflected relative to the connecting flange 6 both in the X direction and in the Y direction. The second section 4.2, 5.2 of the respective connecting plate 4, 5 can thus approach the connecting flange 6 or even come to bear against it. In particular but not exclusively, in the event of such an oblique rear-end force, the deformation of the connecting plates 4, 5 can be optimized by their distance apart in the Y direction being chosen to be sufficiently large that, when deformation takes place, there is no contact or essentially no contact between them. This distance apart can be, for example, at least 50% or at least 70% of the distance between the mounting flange 6 and the side section 2.3 in the X direction.

Figure 5:
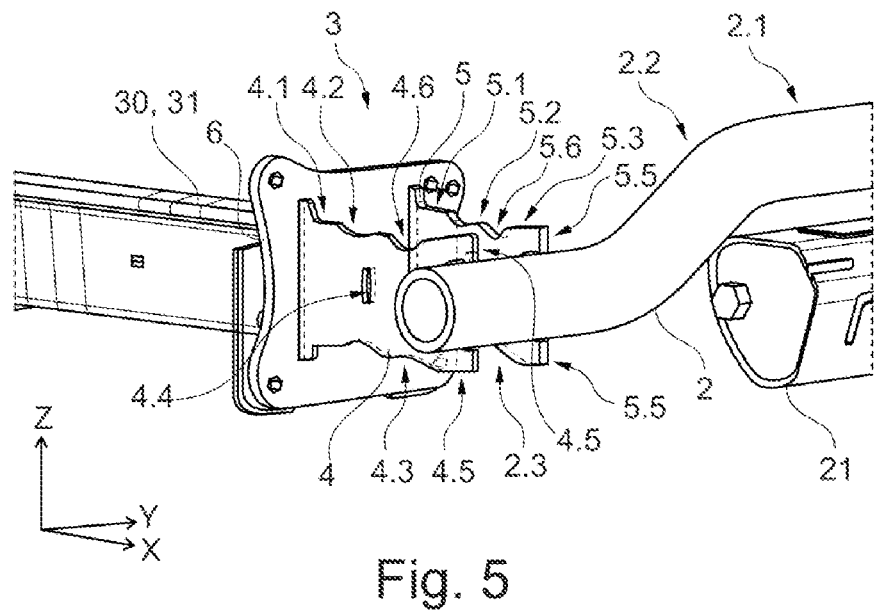
FIG. 5 shows a detailed view of a second embodiment of a trailer coupling assembly according to this disclosure.
Figure 6:
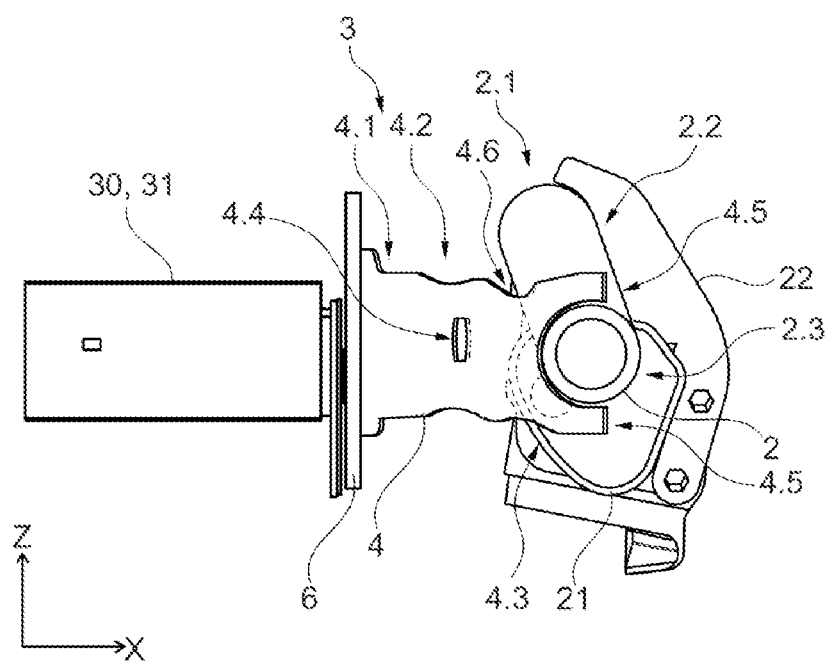
FIG. 6 shows a side view of the trailer coupling assembly from FIG. 5.

The second embodiment of the trailer coupling assembly 1 which is illustrated in FIGS. 5 and 6 differs from the first embodiment regarding the configuration of the connecting plates 4, 5. In particular, the first connecting plate 4 hereby likewise has a notch 4.6 on the edge, the function of which essentially corresponds to the that of the second connecting plate 5.

Although the different examples have the specific components shown in the illustrations, embodiments of this disclosure are not limited to those particular combinations. It is possible to use some of the components or features from one of the examples in combination with features or components from another one of the examples. In addition, the various figures accompanying this disclosure are not necessarily to scale, and some features may be exaggerated or minimized to show certain details of a particular component or arrangement.

One of ordinary skill in this art would understand that the above-described embodiments are exemplary and non-limiting. That is, modifications of this disclosure would come within the scope of the claims. Accordingly, the following claims should be studied to determine their true scope and content.

LIST OF REFERENCE SYMBOLS

1 trailer coupling assembly
2, 12 cross-tube
2.1 central section
2.2 intermediate section
2.3 side section
3, 13 connection assembly
4, 5 connecting plate
4.1, 5.1 first section
4.2, 5.2 second section
4.3, 5.3 third section
4.4, 5.4 through opening
4.5, 5.5 claw section
4.6, 5.6 notch
6 mounting flange
7 sheet metal part
14, 15, 16 sheet-metal part
20 trailer coupling
21 servomotor
22 suspension element
30 vehicle body
31 longitudinal beam
X X-axis
Y Y-axis
Z Z-axis

The invention claimed is:

1. A trailer coupling assembly for a motor vehicle, comprising:
   a cross-beam extending in a transverse direction of the motor vehicle, wherein the cross-beam is configured to connect to a trailer coupling;
   a mount connected to a body of the motor vehicle;
   a connection assembly, wherein the connection assembly includes a plate connecting the mount to the cross-beam, wherein the plate is configured to deform in response to application of a threshold force, wherein the plate has at least one notch in an edge thereof.

2. The trailer coupling assembly as recited in claim 1, wherein:

the cross-beam includes a central section and two side sections on opposite sides of the central section, and the central section is arranged further forward with respect to a longitudinal direction of the motor vehicle than the two side sections, and one of the two side sections is connected to the plate.

3. The trailer coupling assembly as recited in claim 2, wherein the central section is vertically above the two side sections.

4. The trailer coupling assembly as recited in claim 3, wherein the central section and the side sections are connected by intermediate sections inclined at an angle of between 20° and 40° relative to the transverse direction of the motor vehicle.

5. The trailer coupling assembly as recited in claim 1, wherein the plate includes at least one section angled at a non-zero angle to a longitudinal direction of the vehicle.

6. The trailer coupling assembly as recited in claim 5, wherein the plate includes a plurality of sections angled relative to one another.

7. The trailer coupling assembly as recited in claim 5, wherein:

the plate includes a first section adjacent the mount, the plate includes a second section adjacent the first section, the plate includes a third section adjacent the cross-beam, at least one of the first, second, and third sections is inclined at a different angle relative to the longitudinal direction of the motor vehicle than at least one other of the first, second, and third sections.

8. The trailer coupling assembly as recited in claim 7, wherein each of the first, second, and third sections has a different inclination relative to the longitudinal direction of the motor vehicle.

9. The trailer coupling assembly as recited in claim 8, wherein each of the first, second, and third sections runs parallel to a vertical direction of the motor vehicle.

10. The trailer coupling assembly as recited in claim 1, wherein the plate includes at least one through-opening.

11. The trailer coupling assembly as recited in claim 1, wherein:

the plate is a first plate, the trailer coupling assembly includes a second plate spaced-apart from the first plate, the second plate connects the mount to the cross-beam, and the second plate is configured to deform in response to application of the threshold force.

12. The trailer coupling assembly as recited in claim 11, wherein, on sides opposite the mount, the first and second plates each include a recess configured to receive the cross-beam between vertically-offset claws.

13. The trailer coupling assembly as recited in claim 11, wherein the first and second plates are substantial mirror images of one another about a plane between the first and second plates that extends parallel to the longitudinal direction of the motor vehicle.

14. The trailer coupling assembly as recited in claim 1, wherein the threshold force is a predefined force above which the plate will deform plastically.

15. A motor vehicle, comprising:

a trailer coupling;

a cross-beam extending in a transverse direction of the motor vehicle, wherein the cross-beam is connected to the trailer coupling;

a mount connected to a body of the motor vehicle;

a connection assembly, wherein the connection assembly includes first and second plates connecting the mount to the cross-beam, wherein the first and second plates are configured to deform in response to application of a threshold force, wherein the first and second plates include a first section adjacent the mount, a second section adjacent the first section, and a third section adjacent the cross-beam, wherein each of the first, second, and third sections has a different inclination relative to a longitudinal direction of the motor vehicle, wherein each of the first, second, and third sections runs parallel to a vertical direction of the motor vehicle, wherein the first and second plates each have at least one notch in an edge thereof, wherein the first and second plates each include at least one through-opening, and wherein, on sides opposite the mount, each of the first and second plates include a recess configured to receive the cross-beam between vertically offset claws.

16. The motor vehicle as recited in claim 15, wherein the first and second plates are substantial mirror images of one another about a plane between the first and second plates that extends parallel to the longitudinal direction of the motor vehicle.

17. A method, comprising:

deforming a plate in response to application of a threshold force, wherein the plate connects a cross-beam to a mount of a motor vehicle, wherein a trailer coupling is connected to the cross-beam, wherein the cross-beam includes a central section and two side sections on opposite sides of the central section, wherein the central section is arranged further forward with respect to a longitudinal direction of the motor vehicle than the two side sections, wherein one of the two side sections is connected to the plate, wherein the central section is vertically above the two side sections, and wherein the central section and the side sections are connected by intermediate sections which run at an angle of between 20° and 40° relative to the transverse direction of the motor vehicle.

18. The method as recited in claim 17, wherein:

the plate includes a first section adjacent the mount, the plate includes a second section adjacent the first section, the plate includes a third section adjacent the cross-beam, and each of the first, second, and third sections has a different inclination relative to a longitudinal direction of the motor vehicle.

* * * * *